(12) United States Patent
Ellwood et al.

(10) Patent No.: US 12,005,463 B2
(45) Date of Patent: Jun. 11, 2024

(54) COMPOSITE ULTRASONIC MATERIAL APPLICATORS WITH INDIVIDUALLY ADDRESSABLE MICRO-APPLICATORS AND METHODS OF USE THEREOF

(71) Applicant: Ford Motor Company, Dearborn, MI (US)

(72) Inventors: Kevin Ellwood, Ann Arbor, MI (US); Mark Nichols, Saline, MI (US); Wanjiao Liu, Ann Arbor, MI (US); Christopher Seubert, New Hudson, MI (US)

(73) Assignee: Ford Motor Company, Dearborn, MI (US)

( * ) Notice: Subject to any disclaimer, the term of this patent is extended or adjusted under 35 U.S.C. 154(b) by 335 days.

(21) Appl. No.: 17/155,776

(22) Filed: Jan. 22, 2021

(65) Prior Publication Data
US 2021/0339278 A1 Nov. 4, 2021

Related U.S. Application Data

(62) Division of application No. 16/211,554, filed on Dec. 6, 2018, now Pat. No. 10,940,501.
(Continued)

(51) Int. Cl.
*B05B 17/06* (2006.01)
*B05B 1/26* (2006.01)
(Continued)

(52) U.S. Cl.
CPC ......... *B05B 17/0646* (2013.01); *B05B 1/262* (2013.01); *B05B 3/02* (2013.01); *B05B 3/14* (2013.01); *B05B 7/1481* (2013.01); *B05B 12/00* (2013.01); *B05B 12/16* (2018.02); *B05B 12/36* (2018.02); *B05B 13/0431* (2013.01); *B05B 13/0452* (2013.01); *B05B 15/00* (2013.01); *B05B 15/625* (2018.02);
(Continued)

(58) Field of Classification Search
USPC .......... 118/313, 315, 323, 692, 305; 347/55; 239/102.1, 102.2
See application file for complete search history.

(56) References Cited

U.S. PATENT DOCUMENTS 7,784,425 B2 * 8/2010 Matsumoto ............ G02B 5/201
118/313
8,413,602 B2 * 4/2013 Nakamura ........ G02F 1/133516
118/313
(Continued)

FOREIGN PATENT DOCUMENTS

WO WO-2018108568 A1 * 6/2018 ............... B05B 1/14

*Primary Examiner* — Yewebdar T Tadesse
(74) *Attorney, Agent, or Firm* — Burris Law, PLLC (57) ABSTRACT

A material applicator for controlling application of at least one material on a substrate includes a housing and an array plate with an applicator array positioned within the housing. The applicator array has a plurality of micro-applicators and each of the plurality of micro-applicators has an ultrasonic transducer, a material inlet, a reservoir, and a micro-applicator plate with a plurality of apertures. The applicator plate is in mechanical communication with the ultrasonic transducer such that at least one material is ejected through the plurality of apertures as atomized droplets when the ultrasonic transducer vibrates the micro-applicator plate.

18 Claims, 5 Drawing Sheets

Related U.S. Application Data (60) Provisional application No. 62/624,013, filed on Jan. 30, 2018.

(51) Int. Cl.
| | |
|---|---|
| *B05B 3/02* | (2006.01) |
| *B05B 3/14* | (2006.01) |
| *B05B 7/14* | (2006.01) |
| *B05B 12/00* | (2018.01) |
| *B05B 12/16* | (2018.01) |
| *B05B 12/36* | (2018.01) |
| *B05B 13/04* | (2006.01) |
| *B05B 15/00* | (2018.01) |
| *B05B 15/625* | (2018.01) |
| *B05B 15/628* | (2018.01) |
| *B05B 15/68* | (2018.01) |
| *B05B 17/00* | (2006.01) |
| *B05D 1/02* | (2006.01) |
| *B05D 1/12* | (2006.01) |
| *B05D 3/06* | (2006.01) |
| *B25J 11/00* | (2006.01) |

(52) U.S. Cl.
CPC ............ *B05B 15/628* (2018.02); *B05B 15/68* (2018.02); *B05B 17/06* (2013.01); *B05B 17/063* (2013.01); *B05B 17/0653* (2013.01); *B05B 17/0669* (2013.01); *B05D 1/02* (2013.01); *B05D 1/12* (2013.01); *B05D 3/067* (2013.01); *B25J 11/0075* (2013.01)

(56) References Cited

U.S. PATENT DOCUMENTS

| | | | | |
|---|---|---|---|---|
| 2006/0051496 | A1* | 3/2006 | Tashiro | H01J 9/02 |
| | | | | 427/164 |
| 2011/0211021 | A1* | 9/2011 | Sano | B41J 2/14274 |
| | | | | 347/55 |
| 2011/0249059 | A1* | 10/2011 | Takafuji | B41J 3/28 |
| | | | | 347/22 |
| 2013/0129916 | A1* | 5/2013 | Katsumura | H10K 71/611 |
| | | | | 427/98.4 |
| 2019/0077158 | A1* | 3/2019 | Tsubaki | B41J 2/16547 |
| 2019/0337006 | A1* | 11/2019 | Fritz | B05B 1/14 |

* cited by examiner

COMPOSITE ULTRASONIC MATERIAL APPLICATORS WITH INDIVIDUALLY ADDRESSABLE MICRO-APPLICATORS AND METHODS OF USE THEREOF

CROSS-REFERENCE TO RELATED APPLICATIONS

This application claims priority to the benefit of U.S. application Ser. No. 16/211,554, filed Dec. 6, 2018, which claims the benefit of U.S. provisional application No. 62/624,013 filed on Jan. 30, 2018. The disclosures of the above applications are incorporated herein by reference

FIELD

The present invention relates to the painting of vehicles, and more particularly to methods and equipment used in high volume production to paint the vehicles and components thereof.

BACKGROUND

The statements in this section merely provide background information related to the present disclosure and may not constitute prior art.

Painting automotive vehicles in a high volume production environment involves substantial capital cost, not only for application and control of the paint, but also for equipment to capture overspray. The overspray can be up to 40% of the paint that exits an applicator, or in other words, to 40% of the paint that is purchased and applied is wasted (i.e. the transfer efficiency is ~60%). Equipment that captures overspray involves significant capital expenses when a paint shop is constructed, including large air handling systems to carry overspray down through a paint booth, construction of a continuous stream of water that flows under a floor of the paint booth to capture the overspray, filtration systems, and abatement, among others. In addition, costs to operate the equipment is high because air (flowing at greater than 200K CFM) that flows through the paint booths must be conditioned, the flow of water must be maintained, compressed air must be supplied, and complex electrostatics are employed to improve transfer efficiency.

With known production equipment, paint is atomized by rotating bells, which are essentially a rotating disk or bowl that spins at about 20,000-80,000 rpms. The paint is typically ejected from an annular slot on a face of the rotating disk and is transported to the edges of the bell via centrifugal force. The paint then forms ligaments, which then break into droplets at the edge of the bell. Although this equipment works for its intended purpose, various issues arise as a result of its design. First, the momentum of the paint is mostly lateral, meaning it is moving off of the edge of the bell rather than towards the vehicle. To compensate for this movement, shaping air is applied that redirects the paint droplets towards the vehicle. In addition, electrostatics are used to steer the droplets towards the vehicle. The droplets have a fairly wide size distribution, which can cause appearance issues.

These issues of overspray, transfer efficiency, and paint uniformity, among other issues related to the painting of automotive vehicles or other objects in a high volume production environment, are addressed by the present disclosure.

SUMMARY

In one form of the present disclosure, a material applicator for controlling application of at least one material on a substrate includes a housing and an array plate with an applicator array positioned within the housing. The applicator array has a plurality of micro-applicators and each of the plurality of micro-applicators has an ultrasonic transducer, a material inlet, a reservoir, and a micro-applicator plate with a plurality of apertures. The applicator plate is in mechanical communication with the ultrasonic transducer such that at least one material is ejected through the plurality of apertures as atomized droplets when the ultrasonic transducer vibrates the micro-applicator plate.

In some variations, each of the plurality of micro-applicators includes a frame with the reservoir positioned between the frame and the micro-applicator plate. In such variations, the frame can have a back wall and at least one sidewall and the reservoir can be between the back wall and the micro-applicator plate. Also, in at least one variation the ultrasonic transducer is positioned between the frame and the micro-applicator plate.

In some variations, at least a subset of the plurality of micro-applicators is individually addressable to apply the at least one material to the substrate. And in at least one variation a controller configured to individually address the at least a subset of the plurality of micro-applicators is included.

In some variations, the plurality of micro-applicators are aligned on a single plane.

In at least one variation, the plurality of micro-applicators includes a first subset of micro-applicators arranged on a first plane and a second subset of micro-applicators arranged on a second plane parallel to and different to the first plane. In other variations, the plurality of micro-applicators includes a first subset of micro-applicators arranged on a first plane and a second subset of micro-applicators arranged on a second plane non-parallel to the first plane. And in some variations, a controller configured to individually address the first subset of micro-applicators and the second subset of micro-applicators is included.

In at least one variation, the material applicator further includes a robotic arm configured to move the plurality of micro-applicators across a surface.

In another form of the present disclosure, a material applicator for controlling application of at least one material on a substrate includes a housing attached to a robotic arm that is configured to move the housing across a surface and an array plate with an applicator array positioned within the housing. The applicator array comprises a plurality of micro-applicators and each of the plurality of micro-applicators has an ultrasonic transducer, a material inlet, a reservoir, and a micro-applicator plate with a plurality of apertures. The applicator plate is in mechanical communication with the ultrasonic transducer such that at least one material is ejected through the plurality of apertures as atomized droplets when the ultrasonic transducer vibrates the micro-applicator plate.

In some variations, each of the plurality of micro-applicators further comprises a frame with a back wall and at least one sidewall, and the reservoir is between the back wall and the micro-applicator plate. In at least one variation, the ultrasonic transducer is positioned between the frame and the micro-applicator plate.

In some variations, the plurality of micro-applicators includes a first subset of micro-applicators arranged on a first plane and a second subset of micro-applicators arranged on a second plane parallel to and different to the first plane. In other variations, the plurality of micro-applicators comprises a first subset of micro-applicators arranged on a first plane and a second subset of micro-applicators arranged on a second plane non-parallel to the first plane. And in at least one variation a controller is included and configured to individually address the first subset of micro-applicators and the second subset of micro-applicators.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. Examples are provided to fully convey the scope of the disclosure to those who are skilled in the art. Numerous specific details are set forth such as types of specific components, devices, and methods, to provide a thorough understanding of variations of the present disclosure. It will be apparent to those skilled in the art that specific details need not be employed and that the examples provided herein, may include alternative embodiments and are not intended to limit the scope of the disclosure. In some examples, well-known processes, well-known device structures, and well-known technologies are not described in detail.

The present disclosure provides a variety of devices, methods, and systems for controlling the application of paint to automotive vehicles in a high production environment, which reduce overspray and increase transfer efficiency of the paint. It should be understood that the reference to automotive vehicles is merely exemplary and that other objects that are painted, such as industrial equipment and appliances, among others, may also be painted in accordance with the teachings of the present disclosure. Further, the use of "paint" or "painting" should not be construed as limiting the present disclosure, and thus other materials such as coatings, primers, sealants, cleaning solvents, among others, are to be understood as falling within the scope of the present disclosure.

Generally, the teachings of the present disclosure are based on a droplet spray generation device in which a perforate membrane is driven by a piezoelectric transducer. This device and variations thereof are described in U.S. Pat. Nos. 6,394,363, 7,550,897, 7,977,849, 8,317,299, 8,191,982, 9,156,049, 7,976,135, 9,452,442, and U.S. Published Application Nos. 2014/0110500, 2016/0228902, and 2016/0158789, which are incorporated herein by reference in their entirety.

Figure 1:
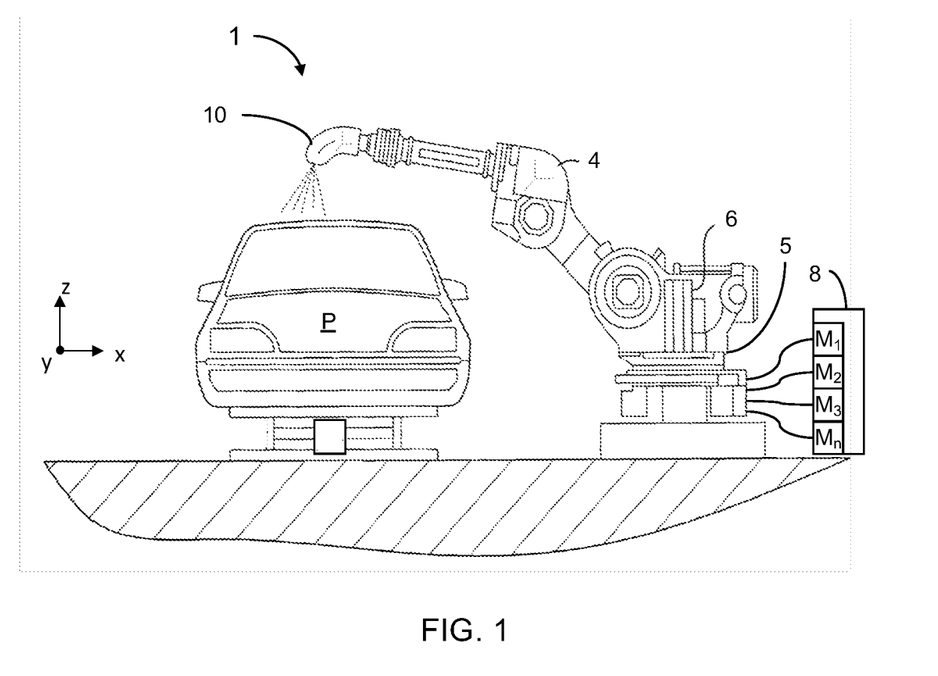
FIG. 1 is a planar view of an exemplary paint spray system according to the teachings of the present disclosure.

Referring now to FIG. 1, a paint spray system 1 for painting a part P using a robotic arms 4 is schematically depicted. The robotic arm 4 is coupled to at least one material applicator 10 and a rack 5. A material source 8 (e.g., a paint source) is included and includes at least one material M (materials $M_1$, $M_2$, $M_3$, . . . $M_n$ shown in FIG. 1; also referred to herein simply as "material M" or "material(S)"). In some aspects of the present disclosure the material M includes different paint materials, different adhesive materials, different sealant materials, and the like. The arm 4 moves according to xyz coordinates with respect to rack 5 such that the material applicator 10 moves across a surface (not labeled) of the part P. Also, a power source 6 is configured to supply power to arm 4 and rack 5. Arm 4 and rack 5 are configured to supply material M from the material source 8 to the material applicator 10 such a coating is applied to the surface of the part P. While FIG. 1 schematically depicts the paint spray system 1 having a single robotic arm 4, it should be understood that paint spray systems with more than one robotic arm 4 are included within the teachings of the present disclosure.

Figure 2A:
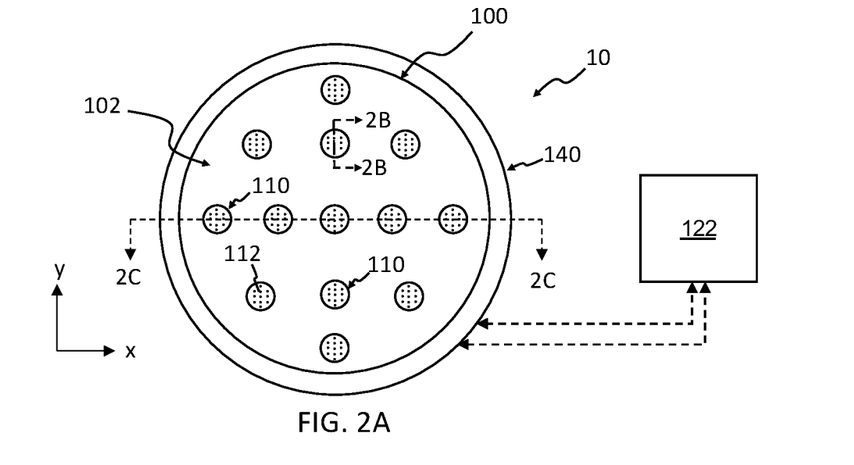
FIG. 2A schematically depicts an exemplary view of an array of micro-applicators according to the teachings of the present disclosure.
Figure 2B:
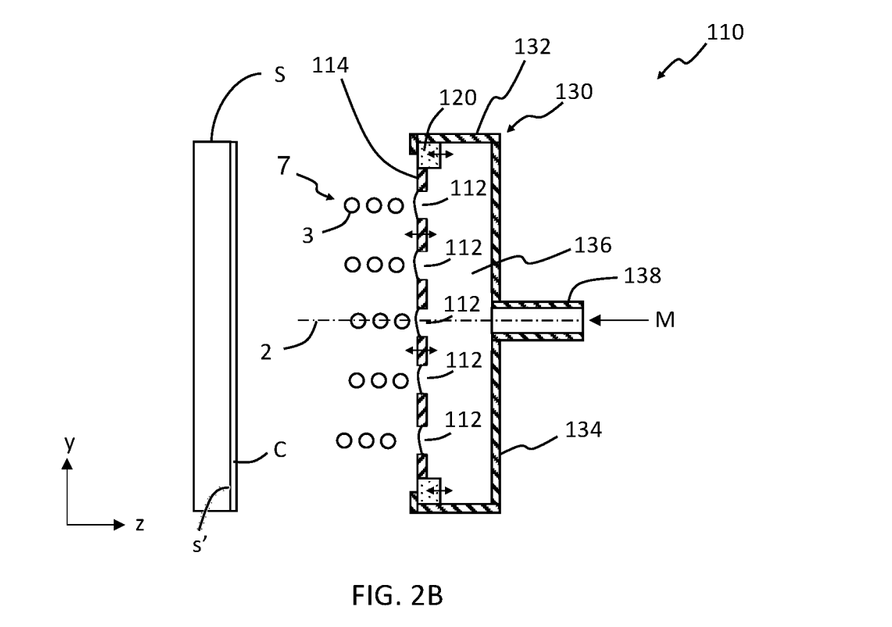
FIG. 2B schematically depicts a side cross-sectional view of section 2B-2B in FIG. 2A.
Figure 2C:
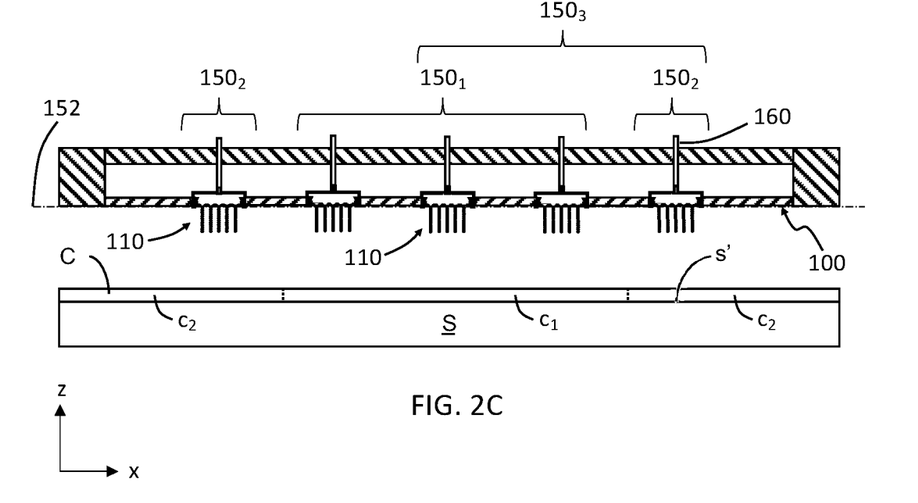
FIG. 2C schematically depicts a side cross-sectional view of section 2C-2C in FIG. 2A.
Figure 3A:
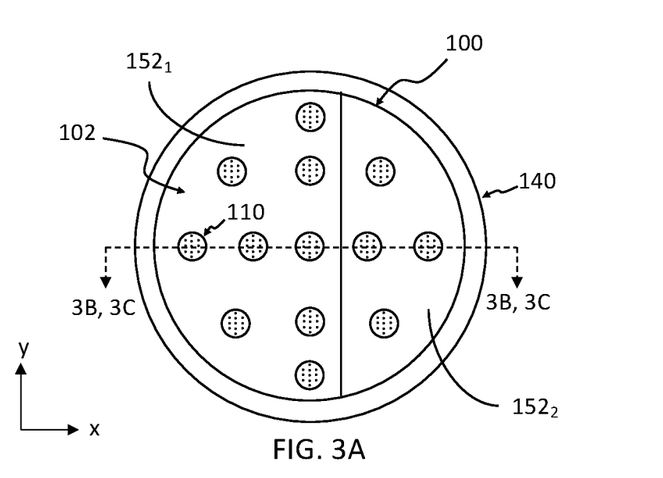
FIG. 3A schematically depicts an exemplary view of an array of micro-applicators according to the teachings of the present disclosure.
Figure 3B:
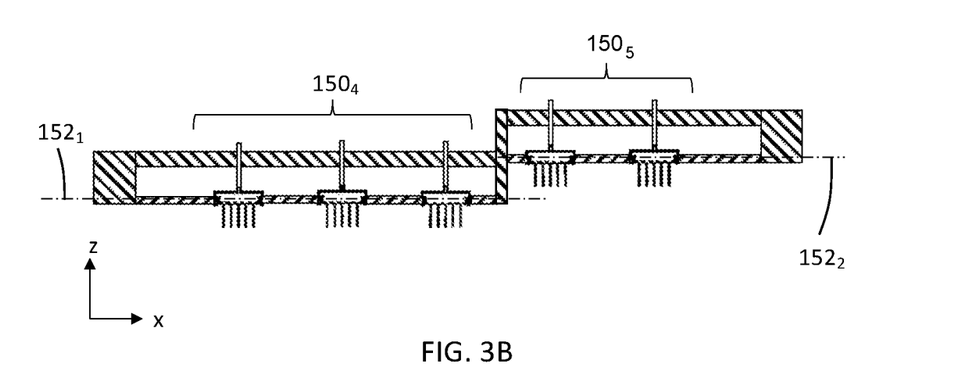
FIG. 3B schematically depicts a side cross-sectional view of section 3B-3B in FIG. 3A.
Figure 3C:
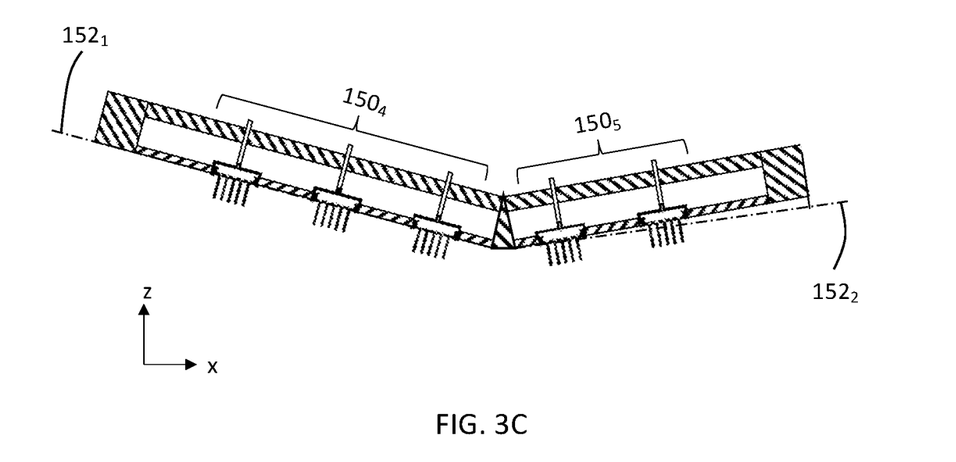
FIG. 3C schematically depicts a side cross-sectional view of section 3C-3C in FIG. 3A.
Figure 4:
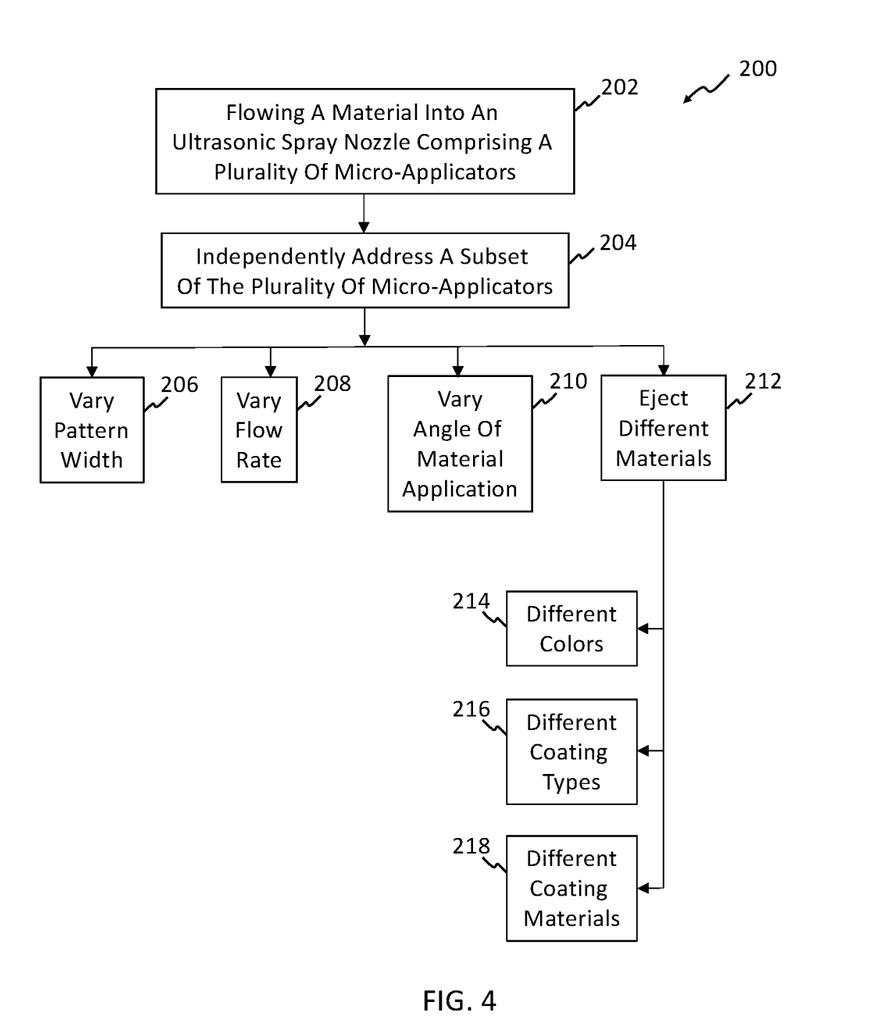
FIG. 4 is a flow diagram illustrating a method of controlling application of at least one material to a substrate according to the teachings of the present disclosure.

Referring now to FIGS. 2A through 2C, the material applicator 10 according to the teachings of the present disclosure is schematically shown. In one form of the present disclosure, the material applicator 10 includes an array plate 100 with an applicator array 102 comprising a plurality of micro-applicators 110. In some aspects of the present disclosure, the array plate 100 lies on single plane. In other aspects of the present disclosure, the array plate 100 does not lie on a single plane as discussed in greater detail below.

In some aspects of the present disclosure, the array plate 100 with the applicator array 102 is positioned within a housing 140. Each of the micro-applicators 110 comprises a plurality of apertures 112 through which a material M is ejected such that atomized droplets 3 of the material are provided as schematically depicted in FIG. 2B. Particularly, each of the micro-applicators 110 has a micro-applicator plate 114 with the plurality of apertures 112 extending through the micro-applicator plate 114. Also, each of the micro-applicators 110 may include a transducer 120, a frame 130 and a material inlet 138. The transducer 120 is in mechanical communication with the micro-applicator plate 114 such that activation of the transducer 120 ultrasonically vibrates the micro-applicator plate 114 as schematically depicted by the horizontal (z-direction) double-headed arrows in FIG. 2B. The frame 130 includes a back wall 134 and at least one sidewall 132 such that a reservoir 136 for containing the material M is provided between the back wall 134 and the micro-applicator plate 114. The inlet 138 is in fluid communication with reservoir 136 and the material source 8 (FIG. 1) such that the material M can flow from the material source 8, through inlet 138 and into reservoir 136.

In operation, material M flows through the inlet 138 into the reservoir 136. Surface tension of material M results in material M not flowing through the apertures 112 of the micro-applicator plate 114 unless transducer 120 is activated and vibrates as schematically depicted in FIG. 2B. That is, when transducer 120 is activated and vibrates, material M is ejected through and/or from the plurality of apertures 112 as atomized droplets 3. In some aspects of the present disclosure the atomized droplets 3 have an average droplet diameter between 5 micrometers (μm) and 100 μm, for example between 10 μm and 75 μm, between 10 μm and 50 μm, or between 20 μm and 40 μm.

As schematically depicted in FIG. 2B, the atomized droplets 3 travel or propagate in a direction generally normal to the micro-applicator plate 114, i.e., generally parallel to a micro-applicator axis 2. As the material M is ejected through and/or from the plurality of apertures 112 a stream 7 of atomized droplets 3 is provided by each of the plurality of apertures 112 and a coating C on the surface(s) s' of a substrate S is provided. While FIG. 2B schematically depicts the stream 7 of atomized droplets 3 propagating on the micro-applicator axis 2, it should be understood that the atomized droplets 3 propagate diffusely from the plurality of apertures 112 and the stream 7 may be angled relative to the micro-applicator axis 2. It should also be understood that other flow configurations of the material M flowing into and out of the reservoir 136 are included in the teachings of the present disclosure in addition to material M entering reservoir 136 through inlet 138 and exiting reservoir 136 through apertures 112.

Referring particularly to FIG. 2C, the micro-applicators 110 are positioned and aligned on a single plane 152. Also, the micro-applicators 110 are arranged in a plurality of subsets $\mathbf{150}_n$ (n=1, 2, . . . ) such that at least one subset 150*n* is individually addressable. For example, FIG. 2C schematically depicts three subsets of micro-applicators 110: subset $\mathbf{150}_1$, subset $\mathbf{150}_2$, and subset $\mathbf{150}_3$. The subset $\mathbf{150}_1$ includes the three middle micro-applicators 110 shown in FIG. 2C, the subset $\mathbf{150}_2$ includes the two outer micro-applicators 110, and the subset $\mathbf{150}_3$ includes the three micro-applicators 110 on the right hand side (+x-direction) of the array plate 100. As shown in FIG. 2C, one subset of micro-applicators (e.g., subset $\mathbf{150}_3$) can include one or more micro-applicators 110 from other subsets (e.g., subsets $\mathbf{150}_1$ and $\mathbf{150}_2$). Further, a subset of the micro-applicators may contain only one micro-applicator 110. Also, each of the micro-applicators can be a subset and thereby be individually addressable.

In some aspects of the present disclosure, a controller 122 (FIG. 2A) is included and enabled to individually address the at least one subset of micro-applicators 110 in the applicator array 102. Particularly, each of the micro-applicators 110 has a supply line 160 (FIG. 2C) in fluid communication with its reservoir 136 and the material source 8. Also, the controller 122 is configured to communicate with (i.e. address, receive, and send data) the power source 6, material source 8 and the at least one subset of micro-applicators 110 such that the at least one subset of micro-applicators 110 is individually addressable (e.g., switched on/off) at any given time. It should be understood that since the controller 122 can individually address the at least one subset of micro-applicators 110, different materials may be sprayed on the surface s' from each applicator array 102. That is, the controller 122 can be configured to control which material M flows into the reservoir(s) of the at least one subset of micro-applicators 110 at any given time such that a coating C comprising a range of thickness, color, rheology, and the like on the surface s' of the substrate S is provided. For example, the coating C in FIG. 2C includes a middle section $c_1$ formed by the subset $\mathbf{150}_1$ of micro-applicators 110 with a different thickness, viscosity, color, curing rate, etc., than and an outer section $c_2$ formed by the subset $\mathbf{150}_2$ of the two outer micro-applicators 110. In the alternative, or in addition to, a first coating or first layer $I_1$ of the coating C may be formed from a first material $M_1$ on the substrate S using a first subset of micro-applicators (e.g., subset $\mathbf{150}_1$) and a second coating or second layer $I_2$ of the coating C may be formed from a second material $M_2$ over the first coating $I_1$ using a second subset of micro-applicators (e.g., subset $\mathbf{150}_2$). In some aspects of the present disclosure, the second coating 12 is applied or formed on the first coating $I_1$ before the first coating $I_1$ is fully cured. It should be understood that the plurality of micro-applicators 110 can move across the surface S (x and/or y directions) such that the first and second coatings $I_1$, $I_2$ can be formed continuously across the surface s' of the substrate S using only a subset of micro-applicators 110. This versatility decreases the consumption of material, energy, etc., of the paint spray system 1 over other high volume production environment paint systems.

While FIGS. 2A through 2C schematically depict the micro-applicators 110 positioned on the single plane 152, FIGS. 3A through 3C schematically depict the micro-applicators positioned on different planes. Particularly, and with reference to FIGS. 3A and 3B, the array plate 100 has two planes $\mathbf{152}_1$ and $\mathbf{152}_2$ arranged parallel but not coplanar to each other. One subset $\mathbf{150}_4$ of the micro-applicators 110 is positioned and aligned on the plane $\mathbf{152}_1$ and another subset $\mathbf{150}_5$ of the micro-applicators 110 is positioned and aligned on the plane $\mathbf{152}_2$. Accordingly, array plate 100 is faceted and has a stepped configuration. Also, and with reference to FIGS. 3A and 3C, the two planes $\mathbf{152}_1$, $\mathbf{152}_2$ of the array plate 100 are arranged non-parallel and nonplanar to each other. One subset $\mathbf{150}_4$ of the micro-applicators 110 is positioned and aligned on the plane $\mathbf{152}_1$ and another subset $\mathbf{150}_5$ of the micro-applicators 110 is positioned and aligned on the plane $\mathbf{152}_2$. Accordingly, array plate 100 is faceted and has an angled configuration with the angle not equal to zero degrees.

While planes $\mathbf{152}_1$ and $\mathbf{152}_2$ schematically depicted in FIG. 3C are convexly angled with respect to each other, it should be understood that planes concavely angled with respect to each other are within the teachings of the present disclosure. Also, in some forms of the present disclosure the array plate 100 is curved (concave or convex).

Referring now to FIG. 4, a method 200 of controlling application of material(s) to a substrate includes flowing a material into an ultrasonic spray nozzle comprising a plurality of micro-applicators at step 202 and independently addressing a subset of the plurality of micro-applicators at step 204. Independently addressing the subset of micro-applicators may include varying a pattern width of atomized droplets ejected from the plurality of micro-applicators at step 206; varying a flow rate of atomized droplets ejected from the plurality of micro-applicators at step 208; varying an angle that the atomized droplets are applied to a surface at step 210; ejecting different materials (e.g., $M_1$, $M_2$, $M_3$, or $M_n$ shown in FIG. 1) at step 212, and combinations thereof. Non-limiting examples of materials ejected at step 212 include paint materials with different colors/pigments shown at 214, materials for different coating types (e.g., paint, sealant, adhesive, etc.) shown at 216, different materials for a given coating type (e.g., a paint basecoat material and a paint clearcoat material) shown at 218; and combinations thereof.

It should be understood from the teaching of the present disclosure that methods of controlling application of a material to a vehicle is provided. The method includes configuring a subset of an array of micro-applicators to eject a different material than the remainder of the micro-applicators. The different material may be a paint basecoat, paint a clearcoat, a flake containing basecoat, a non-flake containing basecoat, and the like. As such, the methods may include configuring a first subset of micro-applicators through which a first material is ejected and configuring a second subset of micro-applicators through which a second material is ejected. The first material may be ejected and applied onto a sag prone area of a vehicle followed by ejecting and applying the second material onto the sag prone area of the vehicle. For example, the first material is a one-component (1K) material and the second material is a rheology control agent. The rheology control agent may be an increased viscosity material or a catalyst material. Coupling the rheology control agent with the 1K material forms a two-component (2K) material that improves overall appearance and sag control of the 2K material on the sag prone area of the vehicle.

As described above the controller is enabled to individually address at least a subset of the micro-applicators. Thus, a plurality of micro-applicators through manual or automated control are configured and enabled to control (on/off/intensity): flow rate of material, material to be applied, number of materials, pattern width, other coating/painting variables, and combinations thereof. It should be understood that controlling material flow rate ejected from the plurality of micro-applicators controls droplet density and controlling density based as a function of part geometry enables uniform coverage and improves efficiency.

As described above, the present disclosure enables individually addressable micro-applicators and individually addressable arrays or subsets of arrays of micro-applicators. In some aspects of the present disclosure the individually addressable micro-applicators enable ejecting two or more different narrowly distributed atomized droplet sizes. For example, each micro-applicator and/or each subset of micro-applicators of a material applicator can eject a different material with its required or optimal atomized droplet size. In one non-limiting example, a first subset of micro-applicators of a material applicator applies (e.g., sprays) a basecoat material without metallic flake to a first area of a substrate and a second subset of micro-applicators of the material applicator applies a basecoat material with metallic flake to a second area of the substrate. Also, the first subset of micro-applicators ejects the basecoat material without metallic flake as atomized droplets with a first narrowly distributed droplet size and the second subset of micro-applicators ejects the basecoat material with metallic flake as atomized droplets with a second narrowly distributed droplet size that is different than the first average droplet size. As used herein, the phrase "narrowly distributed droplet size" refers to a droplet size distribution where greater than 90% of atomized droplets ejected from a micro-applicator have a droplet diameter within +/−10% of a mean droplet size of the atomized droplets ejected from the micro-applicator. In some aspects of the present disclosure, the droplet size distribution comprises greater than 95% of atomized droplets ejected from a micro-applicator having a droplet diameter within +/−5% of a mean droplet size.

In another non-limiting example, a first subset of micro-applicators of a material applicator applies a first color material to a first area of a substrate and a second subset of micro-applicators of the material applicator applies a second color material to a second area of the substrate. Also, the first subset of micro-applicators ejects the first color material as atomized droplets with a first average droplet size and the second subset of micro-applicators ejects the second color material as atomized droplets with a second average droplet size that is different than the first average droplet size. In still another non-limiting example, a first subset of micro-applicators of a material applicator applies a first layer material to a substrate and a second subset of micro-applicators of the material applicator applies a second layer material over the first layer material on the substrate. Also, the first subset of micro-applicators ejects the first layer material as atomized droplets with a first average droplet size and the second subset of micro-applicators ejects the second layer material as atomized droplets with a second average droplet size that is different than the first average droplet size.

It should also be understood that a paint booth using the composite ultrasonic applicators disclosed herein may provide improved efficiency and reduced cost. For example, such a paint booth may have:
airflow reduced from ~100 ft/min. down to/60 ft/min.;
a side-draft booth in automated zones thereby providing a smaller footprint for the paint booth;
reductions in dry-booth material consumption and a reduction or elimination of wet-booth sludge system;
recirculation of air limited only by LEL (lower explosive level) of solvent;
reduction of high pressure water blasting/cleaning of booth grates;
reduced air consumption and associated reduction in energy used to heat, humidify, and condition booth air;
reduced air consumption allowing reductions in abatement equipment size; and
reduction in sludge waste removal and landfill cost.

As used herein, the phrase at least one of A, B, and C should be construed to mean a logical (A OR B OR C), using a non-exclusive logical OR, and should not be construed to mean "at least one of A, at least one of B, and at least one of C.

When an element or layer is referred to as being "on," or "coupled to," another element or layer, it may be directly on, engaged, connected or coupled to the other element or layer, or intervening elements or layers may be present. In contrast, when an element is referred to as being Other words used to describe the relationship between elements should be interpreted in like fashion (e.g., "between" versus "directly between," etc.). As used herein, the term "and/or" includes any and all combinations of one or more of the associated listed items.

Although the terms first, second, third, etc. may be used to describe various elements, components, regions, layers and/or sections, these elements, components, regions, layers and/or sections, should not be limited by these terms. These terms may be only used to distinguish one element, component, region, layer and/or section, from another element, component, region, layer and/or section. Terms such as "first," "second," and other numerical terms when used herein do not imply a sequence or order unless clearly indicated by the context. Thus, a first element, component, region, layer or section, could be termed a second element, component, region, layer or section without departing from the teachings of the example forms. Furthermore, an element, component, region, layer or section may be termed a "second" element, component, region, layer or section, without the need for an element, component, region, layer or section termed a "first" element, component, region, layer or section.

Spacially relative terms, such as "outer," "below," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A material applicator for controlling application of at least one material on a substrate, the material applicator comprising:
    a housing; and
    an array plate with an applicator array positioned within the housing, the applicator array comprising a plurality of micro-applicators, each of the plurality of micro-applicators comprising an ultrasonic transducer, a material inlet, a reservoir, and a micro-applicator plate with a plurality of apertures, wherein the micro-applicator plate is in mechanical communication with the ultrasonic transducer such that at least one material is ejected in an election direction through the plurality of apertures as atomized droplets when the ultrasonic transducer vibrates the micro-applicator plate,
    wherein the material inlet of a first micro-applicator of the plurality of micro-applicators is coupled to a material source to receive a first material from the material source and the material inlet of a second micro-applicator of the plurality of micro-applicators is coupled to the material source to receive a second material from the material source, the second material being different from the first material, wherein the plurality of micro-applicators comprises a first subset of micro-applicators and a second subset of micro-applicators, wherein the micro-applicator plates of the first subset of micro-applicators are arranged on a first plane that is perpendicular to the ejection direction and the micro-applicator plates of the second subset of micro-applicators are arranged on a second plane that is parallel to and offset in the ejection direction from the first plane.

2. The material applicator according to claim 1, wherein each of the plurality of micro-applicators further comprises a frame with the reservoir positioned between the frame and the micro-applicator plate.

3. The material applicator according to claim 2, wherein the frame comprises a back wall and at least one sidewall.

4. The material applicator according to claim 3, wherein the reservoir is between the back wall and the micro-applicator plate.

5. The material applicator according to claim 4, wherein the ultrasonic transducer is positioned between the frame and the micro-applicator plate.

6. The material applicator according to claim 1, wherein at least a subset of the plurality of micro-applicators is individually addressable to apply the at least one material to the substrate.

7. The material applicator according to claim 6 further comprising a controller configured to individually address the at least a subset of the plurality of micro-applicators.

8. The material applicator according to claim 1, wherein the micro-applicator plates of the plurality of micro-applicators are aligned on a single plane.

9. The material applicator according to claim 1 further comprising a controller configured to individually address the first subset of micro-applicators and the second subset of micro-applicators.

10. The material applicator according to claim 1, wherein the plurality of micro-applicators comprises a first subset of micro-applicators and a second subset of micro-applicators, wherein the micro-applicator plates of the first subset of micro-applicators are arranged on a first plane and the micro-applicator plates of the second subset of micro-applicators are arranged on a second plane non-parallel to the first plane.

11. The material applicator according to claim 10 further comprising a controller configured to individually address the first subset of micro-applicators and the second subset of micro-applicators.

12. The material applicator according to claim 10 further comprising a robotic arm configured to move the plurality of micro-applicators across a surface.

13. A material applicator for controlling application of at least one material on a substrate, the material applicator comprising:

a housing attached to a robotic arm configured to move the housing across a surface; and an array plate with an applicator array positioned within the housing, the applicator array comprising a plurality of micro-applicators, each of the plurality of micro-applicators comprising an ultrasonic transducer, a material inlet, a reservoir, and a micro-applicator plate with a plurality of apertures, wherein the micro-applicator plate is in mechanical communication with the ultrasonic transducer such that at least one material is ejected in an election direction through the plurality of apertures as atomized droplets when the ultrasonic transducer vibrates the micro-applicator plate, wherein the plurality of micro-applicators comprises a first subset of micro-applicators and a second subset of micro-applicators, wherein the micro-applicator plates of the first subset of micro-applicators are arranged on a first plane that is perpendicular to the ejection direction and the micro-applicator plates of the second subset of micro-applicators are arranged on a second plane parallel to and offset in the ejection direction from the first plane.

14. The material applicator according to claim 13, wherein each of the plurality of micro-applicators further comprises a frame with a back wall and at least one sidewall, and the reservoir is between the back wall and the micro-applicator plate.

15. The material applicator according to claim 14, wherein the ultrasonic transducer is positioned between the frame and the micro-applicator plate.

16. The material applicator according to claim 13 further comprising a controller configured to individually address the first subset of micro-applicators and the second subset of micro-applicators.

17. A material applicator for controlling application of at least one material on a substrate, the material applicator comprising:

a housing; and an array plate with an applicator array positioned within the housing, the applicator array comprising a plurality of micro-applicators, each of the plurality of micro-applicators comprising an ultrasonic transducer, a material inlet, a reservoir, and a micro-applicator plate with a plurality of apertures, wherein the micro-applicator plate is in mechanical communication with the ultrasonic transducer such that at least one material is ejected through the plurality of apertures as atomized droplets when the ultrasonic transducer vibrates the micro-applicator plate, wherein the plurality of micro-applicators comprises a first subset of micro-applicators and a second subset of micro-applicators, wherein the micro-applicator plates of the first subset of micro-applicators are arranged on a first plane to elect the at least one material in a first ejection direction perpendicular to the first plane and the micro-applicator plates of the second subset of micro-applicators are arranged on a second plane non-parallel to the first plane to eject the at least one material in a second election direction that is perpendicular to the second plane.

18. The material applicator according to claim 17 further comprising a robotic arm attached to the housing and configured to move the housing across a surface.

* * * * *